Figure 1:
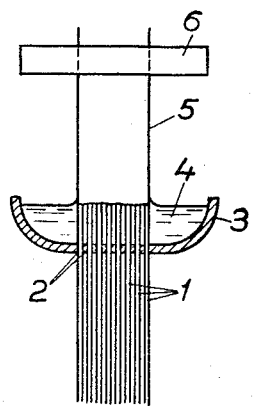

Feb. 6, 1968   B. HANSSON   3,367,397
METHOD OF MANUFACTURING RODS AND TUBES OF METALLIC MATERIAL
Filed Jan. 8, 1965

INVENTOR.
BROR HANSSON
BY
Bailey, Stephens &
Huettig

United States Patent Office 3,367,397
Patented Feb. 6, 1968

3,367,397
METHOD OF MANUFACTURING RODS AND TUBES OF METALLIC MATERIAL
Bror Hansson, Stockholm, Sweden, assignor to Allmanna Svenska Elektriska Aktiebolaget, Vasteras, Sweden, a Swedish corporation
Filed Jan. 8, 1965, Ser. No. 424,357
Claims priority, application Sweden, Jan. 14, 1964, 384/64
7 Claims. (Cl. 164—86)

It is known to manufacture rods of metal, for example of copper, by successively depositing molten metal on a metal strip passing through the melt. This produces a strip which is uniform with but which has greater cross sectional area than the original strip.

In order that there should be good adherence between the original material and the material applied as a coating, it is important that the surfaces of the original material are clean. In order to ensure that the said surfaces are absolutely clean it has previously been suggested to subject the original material to a mechanical surface finishing, for example a de-scaling operation and then to an immediately subsequent operation in an evacuated space for the removal of possibly adsorbed gasses or other volatile components, immediately before it is brought into contact with the molten material.

The present invention refers to a method of manufacturing rods and tubes of metallic material which has considerable advantages over previously known methods. A particular advantage with this method is its simplicity.

The method according to the invention is characterised in that at least two wires or strips or only one strip of a metallic material are passed through a melt of the same or another metallic material and that the wires or the strips, or strip edges if one strip is used, are brought through the melt at such a distance from each other that the coating of the solidified melt formed on the wires, strips or strip forms a tight joint which fills the interstices between the wires, strips or strip edges.

The wires can pass through the melt parallel to each other. They can pass into the melt at a relatively large distance from each other. In this latter case they are brought nearer each other before complete deposition of solidified metal has occurred. This latter case has an advantage, amongst others, in the manufacture of tubes, since the method makes it possible for the molten metal to flow to the inside of the tube, the core consisting either of several wires or strips, or of a single strip which has been bent so that its edges lie close to each other.

The metallic material in the wires or strips can consist of metals such as for example copper, aluminium, lead, steel and nickel. It can also consist of alloys of different kinds such as for example stainless steel or duraluminum. The metallic material in the melt can also consist of one of these said metals or alloys.

If the material in the melt is the same as in the wires or strips, an end product consisting of one and the same metallic material is, of course, produced.

The method is also suitable for manufacturing reinforced products, where wires or strips consist of a material with higher strength or elastic properties than the material which is used in the melt. For example, aluminium tubes and rods reinforced with steel wires or steel strips can be manufactured according to the method. In certain cases, for example in the manufacture of lead sheaths for cables, it can be suitable to arrange the wires in a helical form, so that they serve as armouring in the sheath which due to the helical form of the armouring becomes flexible.

The invention will be further explained below by describing a number of embodiments with reference to the accompanying drawing, where FIG. 1 shows schematically an arrangement for manufacturing rods and tubes, in which the wires, strips or strip pass in the longitudinal direction of the rod or tube, FIGS. 2a–h rods and tubes manufactured in the arrangement according to FIG. 1 in cross section and FIG. 3 an arrangement for manufacturing tubes, in which the wires or strips run in a helical form.

According to FIG. 1 a number of threads 1, for example of aluminium, are introduced into the melt vessel 3 through the nozzles 2 and passed through the metal melt 4, also for example of aluminium. The nozzles may have a construction known in itself. The fit between the nozzles and the wires or strips should be close enough to prevent the molten metal from flowing down into the aperture under the static pressure of the metal bath. During the passage through the melt the wires are coated with molten metal. If the wires are not arranged close to each other already at the introduction, steps are taken so that they will be so, before the wires have been moved so far that the coatings have had time to solidify or be completely formed. Through the fact that the threads are arranged close to each other, there is produced a continuous product 5 of the wires and the metal in the melt after solidification of the melted metal. Depending on how the wires are arranged in relation to each other, the tubes or rods can be manufactured with different cross section, which can be seen in FIG. 2.

It is suitable to arrange a cooling means 6 for cooling the manufactured product at a distance from the melt vessel 3 (FIG. 1). The thickness of the coating can be influenced amongst others by regulating the temperature of the melt and the speed with which the threads are passed through the bath. Before the threads are introduced into the melt vessel 3, it is desirable to ensure that they are clean, which can suitably be brought about as previously mentioned by subjecting them to a surface de-scaling operation and by allowing them to pass through an evacuated chamber for the removal of adsorbing gasses and possible volatile impurities. In order to protect the melt 4 from the effect of the surrounding atmosphere, it can be suitable to have the vessel 3 closed. Replacing of the consumed melt can, of course, be done with the help of a number of alternative arrangements.

Figure 2A:
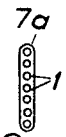
Figure 2B:
Figure 2C:
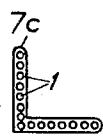
Figure 2D:
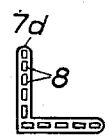
Figure 2E:
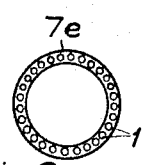
Figure 2F:
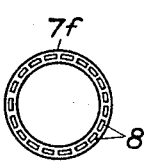
Figure 2G:
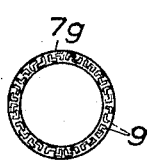
Figure 2H:
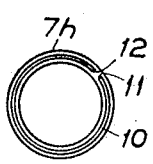

If the nozzles 2 in the bottom of the vessel 3 are arranged in line or if the threads are brought in line with each other before the solidification of the melt on the wires or strips, flat rods 7a and 7b are produced according to FIG. 2a. If the distance between the wires is comparatively great when the melt is taken up and solidifies, as shown in FIG. 2b a rod with corrugated surface is produced. If the nozzles are arranged along lines which form angles with each other or the wires are brought into such a position before the solidification of the melt, the rods (7c) obtain a cross section according to FIG. 2c. FIG. 2d shows a rod 7d of the same type manufactured with narrow strips 8 of rectangular cross section instead of with wires. The tube formed products 7e, 7f, 7g can be produced if the nozzles 2 are arranged in a ring or if the wires or strips are arranged in a ring before the solidification of the melt. The product according to FIG. 2f is manufactured with narrow strips 8 with rectangular cross section and the product according to FIG. 2g with a strip like material 9 with another cross section. For example, tube-shaped products can be manufactured according to FIG. 2h from a single circular bent strip 10 whose edges 11 and 12 lie or are brought close to each other.

Figure 3:
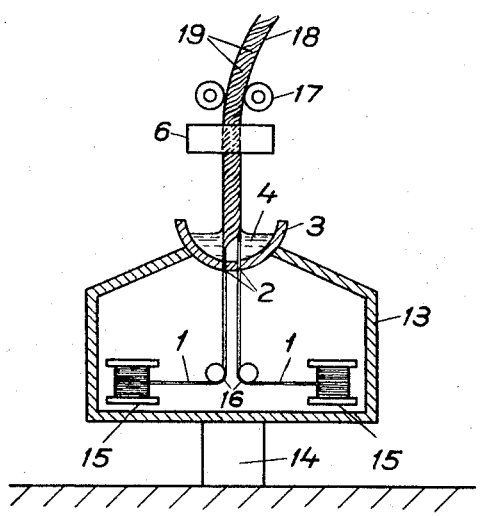

FIG. 3 shows schematically an example of an arrangement for manufacturing tubes with helically running armour. In the round container 13 which is rotatable in the horizontal plane with a driving arrangement 14 of known type shown schematically, there are arranged a number of spools 15 carrying with, for example, steel wire along the inner envelope surface. Only two such coils are shown in the figure. In the upper part of the container a melt vessel 3 fixed to it and containing for example molten lead 4 is placed. The bottom of the vessel is provided with a number of nozzles 2 arranged in a ring of the previously mentioned type. 16 denotes brake rollers and 17 take-off rollers, which are not movable apart from being rotatable around their own shafts. When the steel wires 1 are drawn through the molten lead 4 by the rollers 17 during rotation of the container 13 a lead tube 18 with helically running steel wire armor 19 is produced.

Manufacture of tubes with helically running armor can, of course, also be carried out with the use of a stationary melt vessel if the wires or strips are instead caused to make a helical movement in connection with or soon after their passage of the melt before the metal picked up by the wires or strips in the melt has had time to solidify.

I claim:

1. Method of manufacturing an elongated metallic body, the steps comprising passing at least two strips of a metallic material through a melt of a metallic material, said melt having a free surface, withdrawing the strips from the melt through said free surface in an upward direction causing the metallic material in the melt to deposit in solidified form on the strips, the strips being at the time of such solidification positioned adjacent to each other with such spacing between them that the solidified melt fills the spaces between the strips.

2. Method as claimed in claim 1 in which said strips comprise round wires.

3. Method as claimed in claim 1 in which said metallic material in the strips and said metallic material in the melt are the same metallic material.

4. Method as claimed in claim 1, in which said metallic material in the strips comprises a metallic material having higher mechanical strength than said metallic material in the melt, the strips forming a reinforcement in the elongated metallic body.

5. Method as claimed in claim 1, in which said elongated body comprises a tube and said metallic material in the strips comprises a metallic material having higher mechanical strength than said metallic material in the melt, causing the strips to run helically at the time of solidification of the melt.

6. Method as claimed in claim 1 in which the strips are brought to a final distance from each other before they are introduced in the melt.

7. Method as claimed in claim 1, in which the strips are brought to a final distance from each other after they are introduced in the melt.

References Cited

UNITED STATES PATENTS

| | | | |
|---|---|---|---|
| 275,408 | 4/1883 | Philips et al. | 164—275 X |
| 777,562 | 12/1904 | Straus et al. | 164—84 |
| 910,674 | 1/1909 | Hancock | 164—86 |
| 2,128,943 | 9/1938 | Hudson | 164—86 |
| 2,543,936 | 3/1951 | Reynolds | 164—259 |
| 2,692,411 | 10/1956 | Brennan | 164—70 |
| 3,008,201 | 11/1961 | Carreker | 164—254 |
| 3,055,067 | 9/1962 | Roth | 164—78 |
| 3,060,053 | 10/1962 | Carreker et al. | 164—86 X |

J. SPENCER OVERHOLSER, *Primary Examiner.*

R. S. ANNEAR, *Assistant Examiner.*